（12） United States Patent
Lee

(10) Patent No.: US 6,297,951 B1
(45) Date of Patent: Oct. 2, 2001

(54) HARD DISKDRIVE RACK

(75) Inventor: Tine-Fane Lee, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/417,223

(22) Filed: Oct. 13, 1999

(51) Int. Cl.$^7$ ...................................................... G06F 1/16
(52) U.S. Cl. .......................... 361/685; 361/683; 361/684; 361/686
(58) Field of Search ..................................... 361/683–686

(56) References Cited

U.S. PATENT DOCUMENTS

| | | | |
|---|---|---|---|
| 5,563,767 | * 10/1996 | Chen ...................................... | 361/685 |
| 5,588,728 | * 12/1996 | Eldridge et al. ................... | 312/332.1 |
| 5,694,290 | * 12/1997 | Chang ................................... | 361/685 |
| 6,233,143 | * 5/2001 | Gamble et al. ....................... | 361/685 |

* cited by examiner

Primary Examiner—Leo P. Picard
Assistant Examiner—Yean-Hsi Chang
(74) Attorney, Agent, or Firm—Bacon & Thomas, PLLC

(57) ABSTRACT

A hard diskdrive rack, which includes a mounting frame for holding a hard diskdrive in an electronic apparatus, and two elevation adjustable carrier devices mounted on the mounting frame at two sides and operated to adjust the elevation of the hard diskdrive being installed in the mounting frame for enabling the hard diskdrive to be maintained in flush with the bottom side wall of the mounting frame, the elevation adjustable carrier devices each having a slide moved back and forth in the mounting frame by hand, and a hard diskdrive carrier coupled to the slide and moved vertically to the desired elevation in the mounting frame upon horizontal movement of the slide.

10 Claims, 5 Drawing Sheets

HARD DISKDRIVE RACK

BACKGROUND OF THE INVENTION

The present invention relates to hard diskdrive rack for holding any of different thickness of hard diskdrives. The hard diskdrive rack comprises a mounting frame for holding a hard diskdrive in an electronic apparatus, and two elevation adjustable carrier devices mounted on the mounting frame at two sides and operated to adjust the elevation of the hard diskdrive, for enabling the hard diskdrive to be maintained in flush with the bottom side wall of the mounting frame.

Regular hard diskdrive modules are constructed subject to different models of hard disks used. Because different models of hard disks have different thickness, it is complicated and expensive to prepare different hard diskdrive modules. When different hard diskdrive modules are fabricated, the inventory control of different specifications of hard diskdrive modules is relatively complicated.

SUMMARY OF THE INVENTION

It is the main object of the present invention to provide a hard diskdrive rack, which is practical for holding any of a variety of hard diskdrives of different thickness in an electronic apparatus. According to one aspect of the present invention, the hard diskdrive rack comprises a mounting frame for holding a hard diskdrive in an electronic apparatus, and two elevation adjustable carrier devices mounted on the mounting frame at two sides and operated to adjust the elevation of the hard diskdrive, enabling the hard diskdrive to be maintained in flush with the bottom side wall of the mounting frame. According to another aspect of the present invention, the elevation adjustable carrier devices each comprise a slide having a knob for moving by hand, and a hard diskdrive carrier coupled to the slide and moved vertically to the desired elevation in the mounting frame upon horizontal movement of the slide.

DETAILED DESCRIPTION OF THE PREFERRED EMBODIMENT

Figure 1:
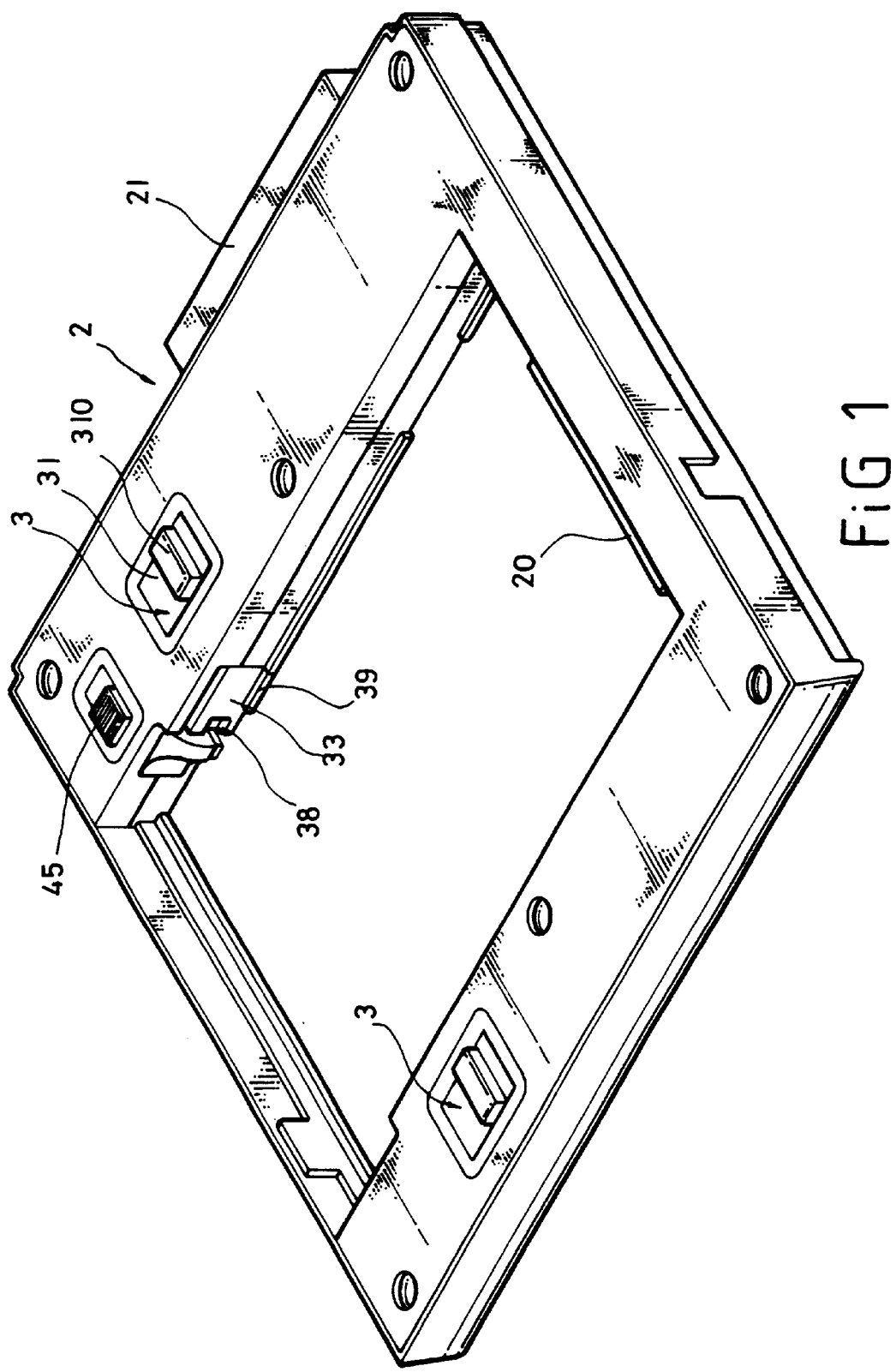
FIG. 1 is an elevational view of a hard diskdrive rack according to the present invention.
Figure 2:
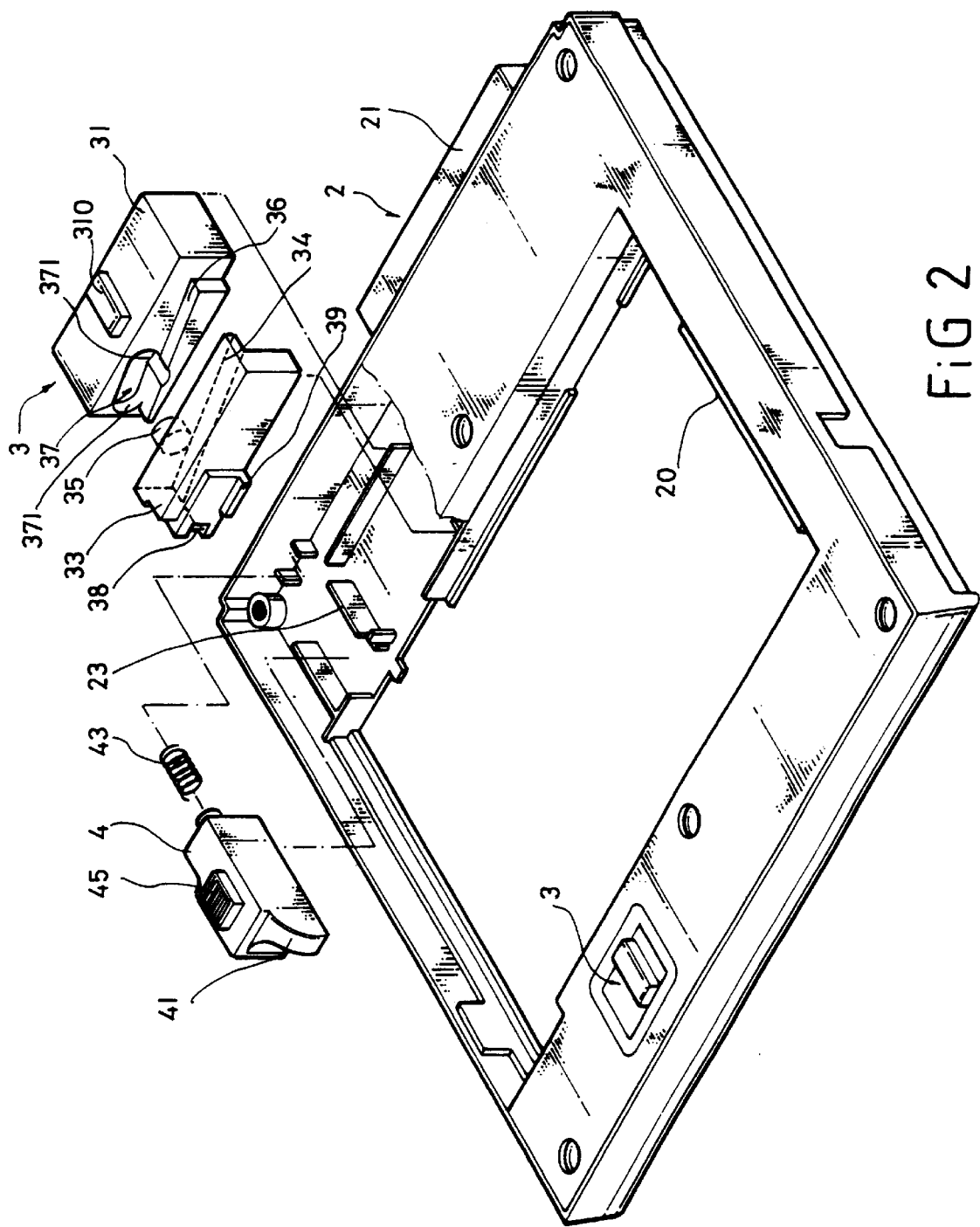
FIG. 2 is an exploded view of the hard diskdrive rack shown in FIG. 1.

Referring to FIGS from 1 through 3, a hard diskdrive rack in accordance with the present invention is shown comprised of a mounting frame 2, a first electric connector 20 provided inside the mounting frame 2 for connection to the hard diskdrive 1 installed in the mounting frame 2, a second electric connector 21 provided at one lateral side of the mounting frame 2 for connection to the master board (not shown) for enabling the hard diskdrive 1 to be controlled by the master board, two elevation adjustable carrier devices 3 symmetrically disposed at two opposite sides and adjusted to hold the installed hard diskdrive 1 in flush with the bottom side of the mounting frame 2, and a latch 4 supported on a spring 43 in the mounting frame 2 at one side for locking the hard diskdrive 1.

The elevation adjustable carrier devices 3 each comprise a slide 31, and a carrier 33. The carrier 33 comprises a bevel edge 34 at one side, a cam 35 at one end of the bevel edge 34, a locating notch 38 provided at an opposite side for engagement with a screw 11 disposed on the corresponding side surface of the hard diskdrive 1, and a locating rib 39 provided at said opposite side near said notch 38 for supporting the corresponding bottom side corner of the hard diskdrive 1. The slide 31 comprises a bevel edge 36 disposed at one side and matched with the bevel edge 34 at the carrier 33, a track 37 disposed at one end of the bevel edge 36, the track 37 having two locating portions 371 at two opposite ends thereof for the positioning of the cam 35 alternatively, and a knob 310 at the top side thereof. Front and rear bumpers 23 are provided in the mounting frame 2 to limit the distance of movement of the elevation adjustable carrier devices 3 in the mounting frame 2. The latch 4 is supported on the spring 43 in the mounting frame 2 at one side adjacent to one elevation adjustable carrier device 3, having a knob 45 raised from the top side wall thereof and a tongue 41 forwardly extended from the front side wall thereof. The spring 43 imparts an outward pressure to the latch 4, causing the tongue 41 to be forced into engagement with the hard diskdrive 1. Through the knob 45, the latch 4 can be pulled backwards to compress the spring 43, and to disengage the tongue 41 from the hard diskdrive 1 for enabling the hard diskdrive 1 to be removed from the mounting frame 2.

Figure 3:
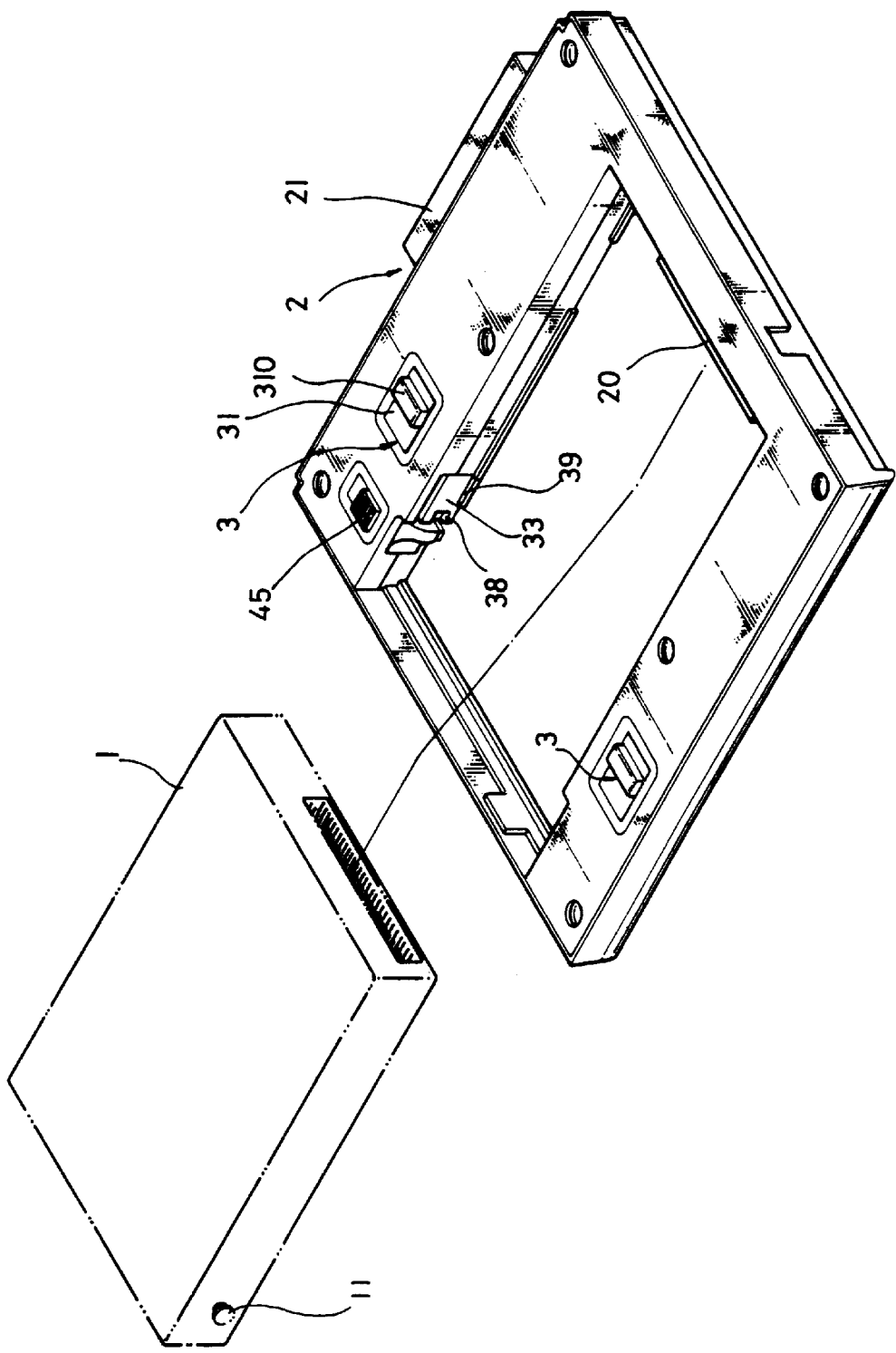
FIG. 3 shows the relationship between the hard diskdrive rack and the hard diskdrive according to the present invention.
Figure 4:
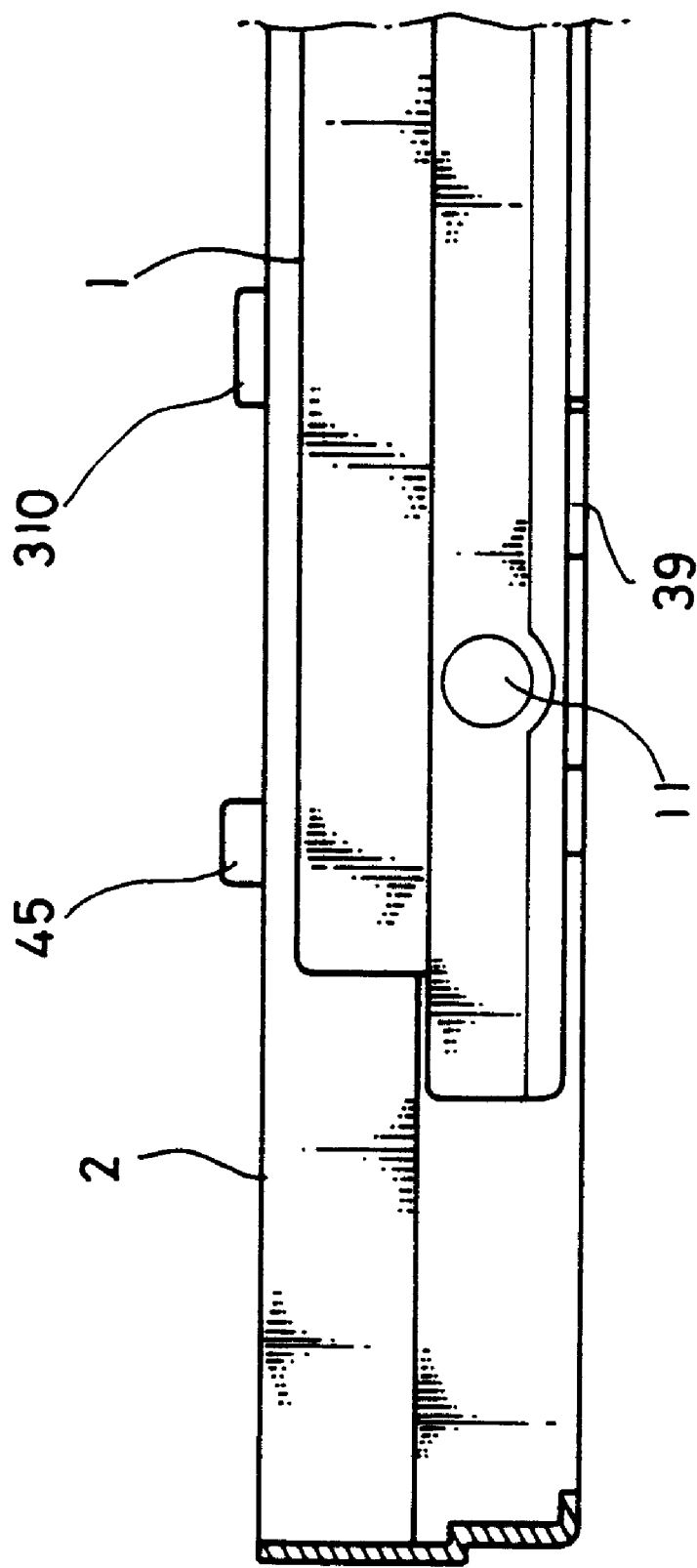
FIG. 4 is a plain view showing a hard diskdrive installed in the mounting frame according to the present invention.
Figure 5:
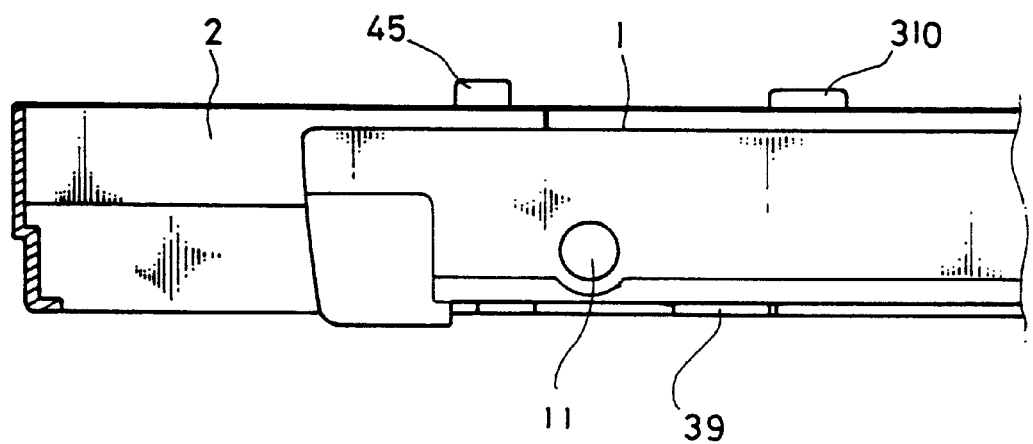
FIG. 5 is a plain view showing a different thickness of hard diskdrive installed in the mounting frame according to the present invention.
Figure 6:
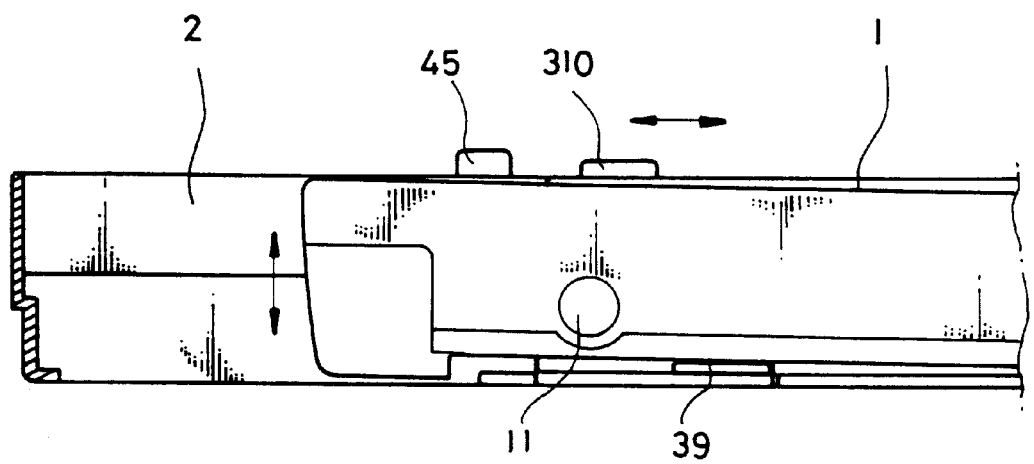
FIG. 6 is a schematic drawing showing the elevation adjustable carrier devices moved, the elevation of the hard diskdrive adjusted.

Referring to FIGS. from 4 through 6 and FIG. 3 again, when a hard diskdrive 1 is installed in the mounting frame 2, through the knob 310 at the slide 31 of each elevation adjustable carrier device 3, the elevation adjustable carrier devices 3 are moved to adjust the elevation of the hard diskdrive 1 (FIGS. 4 and 5 show two hard diskdrives of different thickness alternatively installed in the mounting frame), enabling the hard diskdrive 1 to be maintained in flush with the bottom side of the mounting frame 2 (see FIG. 6). After installation of the hard diskdrive 1, the mounting frame 2 can then be installed in an electronic apparatus.

While only one embodiment of the present invention has been shown and described, it will be understood that various modifications and changes could be made thereunto without departing from the spirit and scope of the invention disclosed.

What the invention claimed is:

1. A hard diskdrive rack comprising:
   a mounting frame for holding a hard diskdrive in an electronic apparatus; and
   two elevation adjustable carrier devices mounted on said mounting frame at two sides, and operated to adjust the elevation of the hard diskdrive being installed in said mounting frame, enabling the hard diskdrive to be maintained in flush with a bottom side wall of said mounting frame, said elevation adjustable carrier devices each comprising a slide moved back and forth in said mounting frame, and a hard diskdrive carrier coupled to said slide and moved vertically to the desired elevation in said mounting frame when said slide is moved horizontally.

2. The hard diskdrive rack of claim 1 wherein the hard diskdrive carrier of each of said elevation adjustable carrier devices comprises a locating rib engaged with the hard diskdrive installed in said mounting frame.

3. The hard diskdrive rack of claim 1 further comprising a first electric connector for connection to the hard diskdrive installed in said mounting frame, and a second electric connector linked to said first electric connector for connection to a master board in the electronic apparatus in which said mounting frame is installed.

4. The hard diskdrive rack of claim 1 wherein the slide of each of said elevation adjustable carrier devices comprises a bevel edge disposed at one side thereof and a track disposed at one end of the bevel edge thereof, and the hard diskdrive carrier of each of said elevation adjustable carrier devices comprises a bevel edge matched with the bevel edge of the corresponding slide and a cam moved with the respective hard diskdrive carrier along the track at the corresponding slide.

5. The hard diskdrive rack of claim 4 wherein the track of the slide of each of said elevation adjustable carrier devices comprises two locating portions at two opposite ends thereof for the positioning of the cam of the corresponding hard diskdrive carrier selectively.

6. The hard diskdrive rack of claim 4 wherein the hard diskdrive carrier of each of said elevation adjustable carrier devices comprises a locating notch and a locating rib provided at one side for engagement with the hard diskdrive installed in said mounting frame.

7. The hard diskdrive rack of claim 4 wherein the slide of each of said elevation adjustable carrier devices comprises a knob rose from topside thereof for moving by hand.

8. The hard diskdrive rack of claim 4 wherein said mounting frame comprises front and rear bumper means, which limit the distance of movement of said elevation adjustable carrier devices in said mounting frame.

9. The hard diskdrive rack of claim 1 further comprising a spring member mounted in said mounting frame, and a latch supported on said spring member in said mounting frame and forced by said spring member into engagement with the hard diskdrive being installed in said mounting frame, said latch comprising a knob raised from a top side wall thereof and a tongue forwardly extended from a front side wall thereof for engagement with the hard diskdrive being installed in said mounting frame.

10. The hard diskdrive rack of claim 9 wherein said spring is a metal coil spring.

* * * * *